United States Patent [19]
Touchette

[11] 3,932,256
[45] Jan. 13, 1976

[54] TIRE BUILDING DRUM

[75] Inventor: John W. Touchette, Hartville, Ohio

[73] Assignee: The Goodyear Tire & Rubber Company, Akron, Ohio

[22] Filed: Aug. 19, 1974

[21] Appl. No.: 498,494

[52] U.S. Cl.................................. 156/417; 156/133
[51] Int. Cl.² ........................................ B29H 17/16
[58] Field of Search .......... 156/414, 415, 417, 418, 156/419, 420

[56] References Cited
UNITED STATES PATENTS

| | | | |
|---|---|---|---|
| 1,731,817 | 10/1929 | Hudson | 156/420 |
| 2,416,523 | 2/1947 | Haren et al. | 156/418 |
| 2,979,110 | 4/1961 | Henley | 156/415 |
| 3,077,917 | 2/1963 | Appleby | 156/416 |
| 3,160,545 | 12/1964 | Burton | 156/415 |
| 3,607,558 | 9/1971 | Nebout | 156/415 |

*Primary Examiner*—Douglas J. Drummond
*Assistant Examiner*—John E. Kittle
*Attorney, Agent, or Firm*—F. W. Brunner; R. S. Washburn

[57] ABSTRACT

A tire building drum, in particular useful for applying a tread to a previously built uncured tire carcass, having a large number of segments, e.g. 36, which can move radially to expand and to contract the drum. An improved arrangement and construction of cover plates for spanning the gaps between the segments in combination with an improved construction of the segments for cooperation with the cover plates.

5 Claims, 3 Drawing Figures

TIRE BUILDING DRUM

The foregoing abstract is not to be taken as limiting the invention of this application, and in order to understand the full nature and extent of the technical disclosure of this application, reference must be made to the accompanying drawing and the following detailed description.

The present invention relates to tire building drums and particularly to tire building drums employing a relatively large number of segments, sometimes called bars, all of which move equally toward and away from the drum axis in radial planes in angularly spaced relation and more particularly the invention relates to an improved combination of the arrangement and construction of the segment-cover plate operating relation.

Briefly, the invention comprises broadly, in a tire building drum having a plurality of segments in cylindrical array and movable radially toward and away from the drum axis and having in an expanded condition of such drum arcuate spaces between the segments thereof and cover plates bridging each of said spaces, which plates cooperate with the respective segments to provide a peripherally and axially continuous working surface on said drum, the improvement comprising the combination wherein each cover plate is longitudinally coextensive with its two associated segments and has a fixed longitudinal edge rigidly affixed to one of said segments and a free longitudinal edge overlying the other of said segments, the plate having an arched contour convex outwardly of the axis such that said cover plate is supported, when free of externally applied load, by the one associated segment and not by the other segment of the pair, and wherein each said other segment is provided with a base surface extending parallel to said drum axis and normal to the radial plane of movement of such segment and a longitudinally extending support surface inclined inwardly from said base surface to underlie and to support said free edge when a load is applied to said cover plate. In its further aspects, the invention comprises the following additional features. The cover plate support surface of each segment lies radially under the free edge of its associated cover plate and is spaced inwardly of the undeflected cover plate at all radial positions of the segments; the support surface of each segment is planar, parallel to the drum axis, and inclined inwardly of the base surface of such segment and toward said other segment on which said cover plate is affixed, said support surface is planar and is inclined at an angle equal to one-half the angle between adjacent segments with respect to a plane tangent to the cylindrical surface defined by said segments at the radial plane of movement of the associated segment, said planar surface extends from a longitudinal side of said segment adjacent the segment to which said cover plate is affixed, said planar surface being inclined radially outwardly of said side to intersect said base surface between said longitudinal side and the fixed edge of the next adjacent cover plate.

While the invention is particularly pointed out in the appended claims, persons skilled in the art will become more fully acquainted with the principles of and enabled to practice the invention, from the following illustrative description of a presently preferred embodiment, and from the drawings attached to and forming a part of such description, in which drawings:

Figure 1:
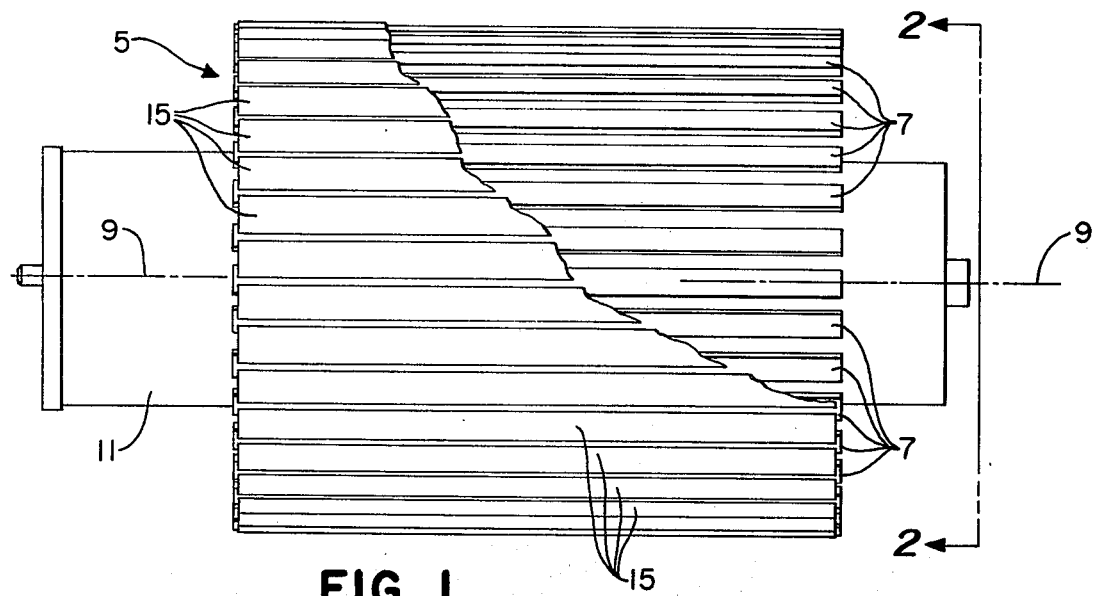
FIG. 1 illustrates in front elevational view a tire building drum embodying the invention.
Figure 2:
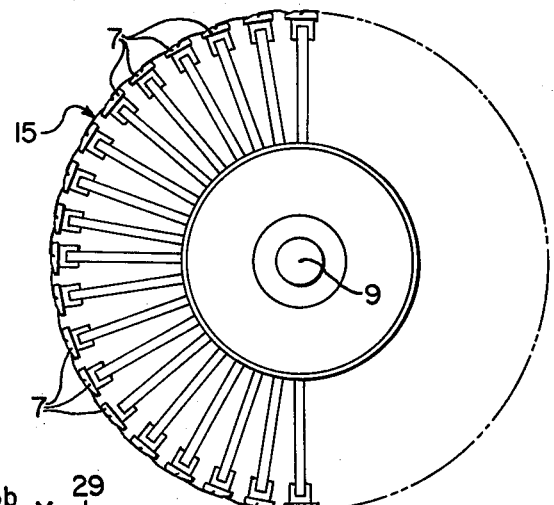
FIG. 2 is a view in end elevation of the drum of FIG. 1.

Turning to the drawings and particularly to FIGS. 1 and 2 thereof, there is illustrated a drum 5 embodying improvements according to the invention. The drum comprises a relatively large number of segments 7 arranged in cylindrical array about the drum axis 9. Each of the segments 7 is movable toward and away from such axis by drum expanding-collapsing means carried by the center shaft 11, and connected to the individual segments for the purpose of moving the segments collectively radially inwardly to collapse the drum or radially outwardly to expand the drum. Inasmuch as the particular expanding-collapsing means employed is not within the scope of the present invention and since further such means are well known, further description thereof here is not deemed to be required.

The presently preferred embodiment and the best mode of practice of the present invention is illustrated and described herein. As the description proceeds it will become apparent to persons skilled in the art that the drum 5 can have any number of segments 7 in excess of about 16 and that the working surface diameter of the drum can be varied over a wide range of diameters so as to accommodate the interior surface diameters of a variety of tire carcasses to be treated on the drum, while providing to each a satisfactorily regular surface at any diameter within such range. Reference herein to an "expanded" condition of the drum, will be understood therefore as to a suitable working diameter, and not to a specifically fixed maximum diameter.

The drum comprises 36 segments 7 which can be moved simultaneously toward the axis 9 to a collapsed condition whereat a tire carcass can be placed on or removed from the drum. The segments can be moved radially outward simultaneously to an expanded condition wherein firm continuous peripheral and axial support can be provided for processing a tire carcass mounted thereon. Each segment moves only in its own radial plane.

The term "carcass" as used herein will be understood to mean an intermediate form of a tire being built and which comprises the essential plies extending between and wrapped about each of two parallel, axially spaced apart bead cores but does not include a tread. Such carcass, built elsewhere, can be applied to the drum 5 for the purpose of applying a tread. Other tire components can be applied as well.

The tire drum thus far described is well known in the art. It is also known to provide for such drums, gap shields or cover plates to span the gaps formed between the segments as the same are moved radially outwardly to an expanded condition.

According to the present invention, a cover plate 15 is provided to bridge each gap between the adjacent pairs of segments such that the plurality of the cover plates 15 cooperate to provide a peripherally and axially continuous working surface for the drum.

Heretofore the radially outward surfaces of the segments of collapsible tire building drums employing cover plates have conformed to the cylindrical surface desired all across the width of each segment in the direction of rotation. According to the present invention, a portion of the surfaces of the segments of the drum surface are purposely formed to lie radially inwardly of the remaining portions of the plane or cylindrical surfaces of the segments, such that in all radial, or diametral, condition of the drum, the undeflected cover plates are supported only by the single segment to which they are respectively attached but are, when radially loaded, supported also by the respectively adjacent segments. Each cover plate 15 is longitudinally coextensive with its two associated segments 7 and has a fixed longitudinal edge 15a rigidly affixed to one of said segments and a free longitudinal edge 15b overlying the other of said segments, the plate having an arched contour convex outwardly of the axis 9.

The cover plates are conventional in material, and in thickness, about 0.040 to 0.060 inch.

Figure 3:
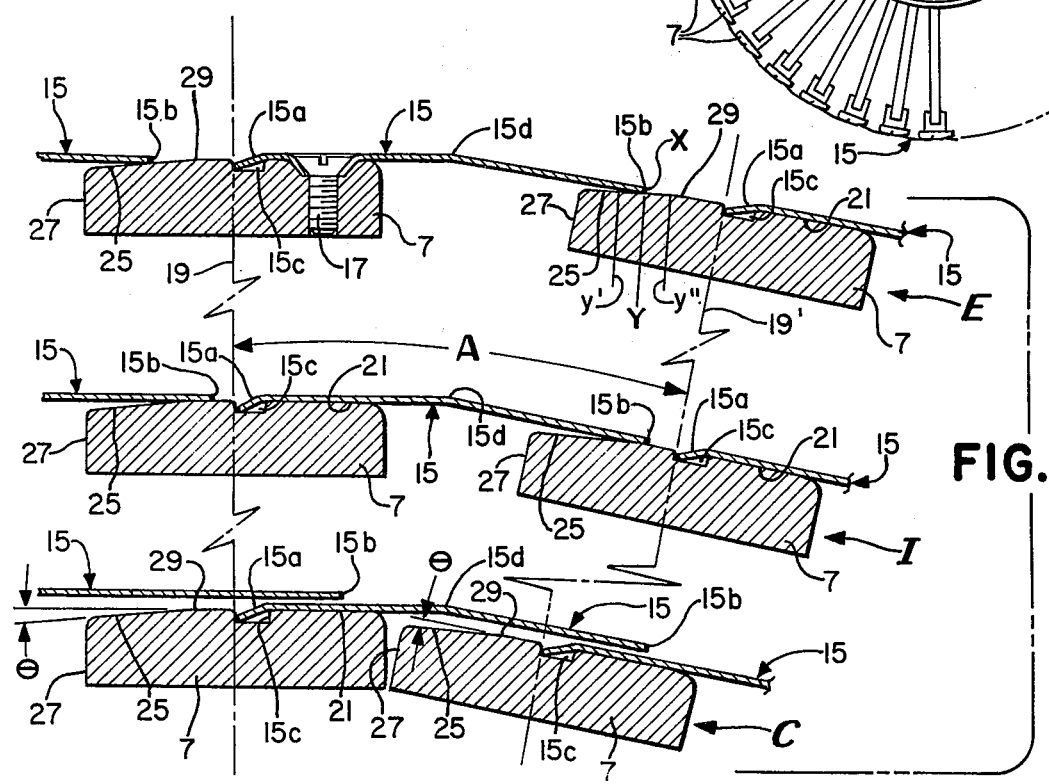
FIG. 3 is an enlarged view of portions of the drum as in FIG. 2 further illustrating the invention.

To fix the longitudinal edge 15a of the cover plate securely to its segment 7, the edge is bent inwardly and seated as shown in a groove 15c formed longitudinally in the segment. The plate is also dimpled to accommodate flat head screws 17 tapped into the segment as shown in FIG. 3. While any suitable means can be used to affix the plate to the segment in the drum, the arrangement described has proved satisfactory.

The arched contour of the cover plates 15 is formed by bending the plate along a bend line 15d parallel of the drum axis. The contour can as well be provided by two or more slight bends parallel with respect to the drum axis, or by curving such plate, to approximate the cylindrical shape of the drum at its expanded condition.

Better to illustrate the present embodiment of the invention, FIG. 3 shows a pair of segments 7 typical of the plurality thereof in the drum 5 and a cover plate 15 representative of the plurality thereof in the drum. These representative segments and the cover plate associated therewith are illustrated in FIG. 3 in three successive positions which represent respectively, a collapsed condition C of the drum, an intermediate condition I thereof, and an expanded condition E.

Each segment comprises a rigid bar extending longitudinally of the drum 5 parallel to the axis 9 thereof, being illustrated in cross-section normal to the axis of the drum in FIG. 3. The respective segments move in planes 19,19' relatively of the axis, which planes are disposed radially and define an angle A therebetween of 10 degrees, since there are 36 segments in the drum. The particular angle A is, of course, defined by the number of segments.

Each segment provides a radially outward surface, termed herein a base surface 21, extending parallel to the drum axis 9 and normal to the radial plane, and a support surface 25, which is a plane surface extending parallel to the axis of the drum. The planar support surface 25 provided on each segment 7 inclines inwardly of the base surface 21 radially inward of the overlying free edge 15b of the associated cover plate and inclines outwardly from the side 27 of the segment. The base surface 21 and the support surface 25 both terminate at an intersection 29 extending parallel to the drum axis. The intersection 29 is spaced from the groove 15c to locate the support surface 25 relative to the free edge 15b of the overlying cover plate in the cooperative relation presently to be described.

As may be seen in FIG. 3, this support surface 25 cooperates with the free edge 15b of the associated cover plate which extends parallel to the axis and overlies the support surface 25. The planar support surface of each segment is inclined inwardly relative to the base surface 21 at such an angle that the free edge 15b of the associated cover plate is, during either collapsing or expanding movement of the segment, spaced closely to such support surface but is not in pressure contact therewith.

The space between the undeflected free edge of the cover plate and the associated support surface of the segment is preferably approximately one-half the thickness of the cover plate but can range from a few thousandths of an inch to as much as the thickness of the cover plate. The actual space between such surface and the undeflected free edge of the cover plate preferably will be constant as the free edge moves relatively of the surface 25 and the adjacent segment 7. This arrangement provides particular advantage in that until the cover plate is deflected by the carcass placed thereon, there is a minimum of sliding contact between the edge and the surface. Thus the potential interference between the cover plate and the segment is greatly reduced relative the potential for such interference in the heretofore relation between the cover plates and segments in the prior art.

The cover plate 15 is supported entirely, in its unloaded condition, by the segment 7 to which the fixed edge 15a is rigidly secured. The space provided between the free edge 15b and the support surface 25 of the adjacent segment is closed by an application of a minimal radial load during processing of the carcass on the drum so that such deflection is fully elastic and results in no permanent distortion of the cover plate due to such load.

In order that the free edge 15b of the cover plate carried by the first segment shall move in constant spaced relation with the support surface 25 on the adjacent segment, the planar surface 25 is inclined at 5°. This relation, surprisingly, is, for all numbers of segments used, one-half the angle between adjacent segments. The surface 25 of each segment 7 is inclined at 5° with respect to a plane tangent to the cylindrical surface, defined by the base surfaces 21 of the segments, at the radial plane 19' of movement of that segment. The angle of inclination of the surface 25 with respect to the base surface 21 of the segment, is also at or close to 5°.

While the preferred angle of incline of the support surface 25 can readily be determined by conventional graphic methods for a drum of any suitable number of segments, such slope can also be determined by a simple trigonometric analysis as follows: the movement of a point X (which designates the free edge 15b near the surface 25), referred to the radial plane 19 and to the axis 9 is, of course, identical to the change of radius R' parallel to the plane 19 and has no component (zero relative movement) perpendicular to that plane. A point Y on the support surface 25 can lie between y' and y'' thereon and represents the position of potential contact of point X with the plane 25 as that segment 7 moves relatively of the cover plate 15. Referring to the plane 19, the movement of Y is a compound movement which can be resolved into a component parallel to the plane 19 and a component perpendicular to the plane 19. The motion of point Y parallel to plane 19 is the product of the change in radius R' times the cosine (cos A) of the angle A between the planes 19 and 19'. The motion of point Y perpendicular to the plane 19 is given by the product of the change of radius R' times the sine (sin A) of the angle A.

Summing the respective movements of the points X and Y in a direction parallel to the plane 19, the movement of Y relative to X is given by:

$$R' - R'(\cos A)$$

and the relative motion of Y relative to X perpendicular to the plane 19 given by:

$$(0 - R' \sin A)$$

The vector addition of the two components yields an angle $\theta$ whose tangent is:

$$\frac{(R' \text{ vers } A)}{(R' \sin A)}$$

Substituting the 10 degrees of the present drum for A yields 0.015/0.174 giving an angle $\theta$ whose tangent is 0.087 and an angle $\theta$ of 5°.

By substituting the angle established by selection of a number of segments other than 36, it can be readily determined that, for example, for 24 segments spaced at 15°, the resulting angle is 7½°, and for, for example, 45 segments, defining angles of 8°, the desired angle of incline is 4°.

It will be observed in FIG. 3 that at the maximum diameter of the working surface of the drum, the free edge 15b of the cover plate overlies only a portion of the support surface 25 and is therefore slightly inward radially of the fixed edge 15a of the next cover plate. As the drum is partially collapsed, as indicated in the intermediate condition, the free edge of the cover plate approaches the termination at 29 of the support surface 25 and the intersection therewith of the base surface 21 of the adjoining segment. In such intermediate condition the cover plates define a substantially cylindrical and continuous surface. In the collapsed condition (C in FIG. 3) of the drum the free edge 15b of the cover plate is radially outward and overlies the fixed edge 15a of the adjoining cover plate. From this illustration, it will be clear that at no point in the radially inward or outward movement of the segments is there any occasion for interference between the cover plates and the respective segments.

The particularly improved combination according to the invention of segments and their associated cover plates provide numerous advantages in the practical utility of the tire building drum. Both the cover plates themselves and the segments are easily made or converted according to the principles of the invention by simple common metal forming operations readily available.

The cover plates themselves are much less likely than in conventional practice to interfere with the associated segments during movement of the segments and cover plates radially inwardly or radially outwardly with respect to the axis and are hence less subject to damage.

The frictional sliding of the cover plate relative to the segment, particularly while free of external load, is eliminated thus relieving that part of the friction load to which the drum expanding mechanism is subjected.

In accordance with the principles of the invention, the working surface of the tire building drum can be more nearly a regular circular cylinder over a greater range of drum diameter change than has heretofore been available.

When the particular segments 7 are removed and replaced, as for changing the maximum working diameter of the drum, the cover plate-segment arrangement can be handled as an assembly, eliminating need for refitting cover plates individually at each such change.

While certain representative embodiments and details have been shown for the purpose of illustrating the invention, it will be apparent to those skilled in the art that various changes and modifications may be made therein without departing from the spirit or scope of the invention.

What is claimed is:

1. In a tire building drum having a plurality of segments in cylindrical array and movable radially toward and away from the drum axis and having in an expanded condition of such drum arcuate spaces between the segments thereof and cover plates bridging each of said spaces, which plates cooperate with the respective segments to provide a peripherally and axially continuous working surface on said drum, the improvement comprising the combination wherein each cover plate is longitudinally coextensive with its two associated segments and has a fixed longitudinal edge rigidly affixed to one of said segments and a free longitudinal edge radially outward of and overlying the other of said segments, said plate having an arched contour convex outwardly of said axis is provided with a base surface extending parallel said drum axis and normal to the radial plane of movement of such segment and a longitudinally extending support surface inclined inwardly from said base surface to underlie and to support said free edge only when a radially inward load is applied to said cover plate.

2. A tire building drum as claimed in claim 1, wherein the cover plate support surface of each segment which lies radially under the free edge of its associated cover plate is spaced inwardly of the undeflected cover plate at all radial positions of the segments.

3. A tire building drum as claimed in claim 1, wherein said support surface of each segment is planar, parallel to the drum axis, and inclined inwardly of the base surface of such segment and toward said other segment on which said cover plate is affixed.

4. A tire building drum as claimed in claim 1, wherein said support surface is planar and is inclined at an angle equal to one-half the angle between adjacent segments with respect to a plane tangent to the cylindrical surface defined by said segments at the radial plane of movement of the associated segment.

5. A tire building drum as claimed in claim 1, wherein said planar surface extends from a longitudinal side of said segment adjacent the segment to which said cover plate is affixed, said planar surfae being inclined radially outwardly of said side to intersect said base surface between said longitudinal side and the fixed edge of the next adjacent cover plate.

* * * * *

UNITED STATES PATENT OFFICE
CERTIFICATE OF CORRECTION

PATENT NO. : 3,932,256
DATED : January 13, 1976
INVENTOR(S) : John W. Touchette

It is certified that error appears in the above—identified patent and that said Letters Patent are hereby corrected as shown below:

Claim 1, line 31, after "outwardly of said axis" insert -- and wherein each said other segment --.

Signed and Sealed this twenty-fifth Day of May 1976

[SEAL]

Attest:

RUTH C. MASON
Attesting Officer

C. MARSHALL DANN
Commissioner of Patents and Trademarks